(12) United States Patent
Li

(10) Patent No.: US 11,909,244 B2
(45) Date of Patent: Feb. 20, 2024

(54) BATTERY CONTROLLER AND METHOD FOR SUPPRESSION OF LITHIUM PLATING DURING CHARGING

(71) Applicant: CONTEMPORARY AMPEREX TECHNOLOGY CO., LIMITED, Ningde (CN)

(72) Inventor: Haili Li, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/365,362

(22) Filed: Jul. 1, 2021

(65) Prior Publication Data
US 2022/0255336 A1    Aug. 11, 2022

Related U.S. Application Data

(63) Continuation of application No. PCT/CN2021/076274, filed on Feb. 9, 2021.

(51) Int. Cl.
*H02J 7/00*    (2006.01)
(52) U.S. Cl.
CPC ........ *H02J 7/00712* (2020.01); *H02J 7/0048* (2020.01); *H02J 7/007182* (2020.01); *H02J 2310/54* (2020.01)
(58) Field of Classification Search
CPC .... H02J 7/0031; H02J 7/00712; H02J 7/0048; H02J 7/00711; H02J 7/007182
(Continued)

(56) References Cited

U.S. PATENT DOCUMENTS

| 4,385,269 A | * | 5/1983 | Aspinwall | ......... | H02J 7/007184 320/152 |
| 4,829,225 A | * | 5/1989 | Podrazhansky | ...... | H02J 7/00711 320/129 |

(Continued)

FOREIGN PATENT DOCUMENTS

| CN | 109546248 A | 3/2019 |
| CN | 110509818 A | 11/2019 |

(Continued)

OTHER PUBLICATIONS

International Search Report of Application No. PCT/CN2021/076274, dated Oct. 14, 2021, 4 pages.

(Continued)

*Primary Examiner* — John T Trischler
(74) *Attorney, Agent, or Firm* — Ladas & Parry LLP

(57) ABSTRACT

Disclosed are a battery charging method, a controller, a battery management system, a battery, and an electric device, aimed to suppress lithium plating of the battery. The battery charging method includes: obtaining an electrical parameter of a battery; determining whether the electrical parameter of the battery reaches a preset threshold, where a value range of the preset threshold meets the following condition: a battery state of charge (SOC) corresponding to the preset threshold is 70% to 80%; suspending, when the electrical parameter of the battery reaches the preset threshold, charging of the battery and discharging the battery for a duration of t; and continuing to charge the battery when the discharge is completed.

12 Claims, 7 Drawing Sheets

(58) Field of Classification Search
USPC .......................................................... 320/134
See application file for complete search history.

(56) References Cited

U.S. PATENT DOCUMENTS

| | | | | |
|---|---|---|---|---|
| 5,304,914 | A * | 4/1994 | Feldstein | H02J 7/007182 |
| | | | | 320/132 |
| 5,307,000 | A * | 4/1994 | Podrazhansky | H02J 7/0069 |
| | | | | 320/149 |
| 5,493,196 | A * | 2/1996 | Feldstein | H02J 7/0018 |
| | | | | 320/132 |
| 5,500,583 | A * | 3/1996 | Buckley | H02J 7/00711 |
| | | | | 320/133 |
| 5,523,667 | A * | 6/1996 | Feldstein | H02J 7/0018 |
| | | | | 320/120 |
| 5,621,297 | A * | 4/1997 | Feldstein | H02J 7/007182 |
| | | | | 320/132 |
| 5,694,023 | A * | 12/1997 | Podrazhansky | H02J 7/00711 |
| | | | | 320/132 |
| 5,889,385 | A * | 3/1999 | Podrazhansky | H02J 7/00711 |
| | | | | 320/160 |
| 5,998,968 | A * | 12/1999 | Pittman | H02J 7/00711 |
| | | | | 320/145 |
| 6,097,172 | A * | 8/2000 | Podrazhansky | H02J 7/00711 |
| | | | | 320/148 |
| 6,232,750 | B1 * | 5/2001 | Podrazhansky | H02J 7/00711 |
| | | | | 320/139 |
| 6,441,588 | B1 * | 8/2002 | Yagi | H02J 7/007194 |
| | | | | 320/150 |
| 6,456,041 | B1 * | 9/2002 | Terada | B60L 58/15 |
| | | | | 320/132 |
| 6,836,098 | B1 * | 12/2004 | O'Brien | H02J 7/345 |
| | | | | 320/166 |
| 7,495,417 | B2 * | 2/2009 | Ishishita | G01R 31/396 |
| | | | | 320/134 |
| 7,564,221 | B2 * | 7/2009 | Asai | G01R 31/367 |
| | | | | 320/132 |
| 7,714,541 | B2 * | 5/2010 | Stamos | H02J 7/0072 |
| | | | | 324/426 |
| 7,723,958 | B2 * | 5/2010 | Darilek | G01R 31/3828 |
| | | | | 320/132 |
| 7,808,210 | B2 * | 10/2010 | Darilek | H02J 7/0071 |
| | | | | 320/132 |
| 7,825,630 | B2 * | 11/2010 | Stamos | H02J 7/007182 |
| | | | | 324/426 |
| 7,830,125 | B2 * | 11/2010 | Ibrahim | H02J 7/0014 |
| | | | | 320/136 |
| 8,237,398 | B2 * | 8/2012 | Iida | H02J 7/0071 |
| | | | | 320/134 |
| 8,264,203 | B2 * | 9/2012 | Darilek | G01R 31/3648 |
| | | | | 320/132 |
| 8,288,995 | B2 * | 10/2012 | Jimbo | H01M 10/441 |
| | | | | 320/147 |
| 8,390,253 | B2 * | 3/2013 | Arai | H02J 7/04 |
| | | | | 320/109 |
| 8,395,355 | B2 * | 3/2013 | Kaita | H02J 7/005 |
| | | | | 180/68.5 |
| 8,497,686 | B2 * | 7/2013 | Hoshino | G06Q 30/06 |
| | | | | 320/132 |
| 8,577,529 | B2 * | 11/2013 | Takahashi | H02J 7/0016 |
| | | | | 701/22 |
| 8,629,655 | B2 * | 1/2014 | Arai | B60L 58/21 |
| | | | | 320/109 |
| 8,648,603 | B2 * | 2/2014 | Harada | H01M 10/486 |
| | | | | 324/425 |
| 9,063,018 | B1 * | 6/2015 | Ghantous | G01K 13/00 |
| 9,146,280 | B2 * | 9/2015 | Sun | G01R 31/367 |
| 9,236,745 | B2 * | 1/2016 | Izumi | B60L 58/20 |
| 9,431,832 | B2 * | 8/2016 | Ichikawa | H02J 7/0016 |
| 9,455,480 | B2 * | 9/2016 | Yoshida | H02J 7/0048 |
| 9,496,742 | B2 * | 11/2016 | Suga | H02J 7/0091 |
| 9,651,406 | B2 * | 5/2017 | Unagami | H02J 7/0021 |
| 9,660,305 | B2 * | 5/2017 | Hatta | H01M 10/633 |
| 9,682,637 | B2 * | 6/2017 | Shimizu | B60L 53/63 |
| 9,698,610 | B2 * | 7/2017 | Miyazaki | H02J 7/04 |
| 9,726,554 | B1 * | 8/2017 | Ghantous | G01K 15/00 |
| 9,738,173 | B2 * | 8/2017 | Wakasugi | H02J 7/0013 |
| 9,761,861 | B1 * | 9/2017 | Holme | C25D 5/18 |
| 10,090,695 | B2 * | 10/2018 | Card | H02J 7/00711 |
| 10,101,401 | B2 * | 10/2018 | Sejima | G01R 31/3842 |
| 10,122,042 | B2 * | 11/2018 | Krasovitsky | H01M 10/4228 |
| 10,132,867 | B1 * | 11/2018 | Kondo | H01M 10/0525 |
| 10,161,992 | B2 * | 12/2018 | Kawamura | G01R 31/382 |
| 10,193,366 | B2 * | 1/2019 | Josephs | H02J 7/0048 |
| 10,279,700 | B2 * | 5/2019 | Takebayashi | B60L 58/13 |
| 10,295,604 | B2 * | 5/2019 | Oh | G01R 31/367 |
| 10,310,024 | B2 * | 6/2019 | Kondo | H01M 10/48 |
| 10,408,887 | B2 * | 9/2019 | Shimizu | G01R 31/392 |
| 10,436,850 | B2 * | 10/2019 | Hatano | G01R 19/16542 |
| 10,444,290 | B2 * | 10/2019 | Kawamura | H02J 1/06 |
| 10,459,035 | B2 * | 10/2019 | Takemura | H02J 7/0021 |
| 10,476,280 | B2 * | 11/2019 | Fukushima | H01M 50/204 |
| 10,491,033 | B2 * | 11/2019 | Wei | H02J 7/007 |
| 10,500,970 | B2 * | 12/2019 | Kawamura | H01M 16/00 |
| 10,581,255 | B2 * | 3/2020 | Hale | H02J 7/0021 |
| 10,601,070 | B2 * | 3/2020 | Krasovitsky | H02J 7/04 |
| 10,625,627 | B2 * | 4/2020 | Duan | B60L 58/10 |
| 10,661,678 | B2 * | 5/2020 | Vidhi | G06Q 20/14 |
| 10,686,229 | B2 * | 6/2020 | Kawahara | H01M 10/0525 |
| 10,712,393 | B2 * | 7/2020 | Sejima | H01M 10/482 |
| 10,725,111 | B2 * | 7/2020 | Kawahara | G01R 31/367 |
| 10,784,497 | B2 * | 9/2020 | Holme | H01M 4/1395 |
| 10,910,860 | B2 * | 2/2021 | Fu | H01M 10/44 |
| 11,088,402 | B2 * | 8/2021 | Krasovitsky | H02J 7/007 |
| 11,095,143 | B2 * | 8/2021 | Akaishi | B60L 58/13 |
| 11,105,859 | B2 * | 8/2021 | Takahashi | G01R 35/00 |
| 11,223,212 | B2 * | 1/2022 | Akaishi | H02J 7/0047 |
| 11,342,544 | B2 * | 5/2022 | Holme | H01M 4/045 |
| 11,355,740 | B2 * | 6/2022 | Holme | H01M 4/045 |
| 11,397,215 | B2 * | 7/2022 | Ghantous | H02J 7/0047 |
| 11,614,490 | B2 * | 3/2023 | Bryngelsson | G01R 31/367 |
| | | | | 702/63 |
| 11,626,742 | B2 * | 4/2023 | Akaishi | H02J 7/007186 |
| | | | | 320/134 |
| 11,721,842 | B2 * | 8/2023 | Lemke | H01M 10/425 |
| | | | | 429/120 |
| 11,728,525 | B2 * | 8/2023 | Ghantous | H02J 7/0047 |
| | | | | 702/63 |
| 11,791,647 | B2 * | 10/2023 | Berkowitz | G01R 31/382 |
| | | | | 320/139 |
| 2002/0070710 | A1 * | 6/2002 | Yagi | B60L 58/10 |
| | | | | 320/150 |
| 2004/0251880 | A1 * | 12/2004 | O'Brien | H02J 7/345 |
| | | | | 320/166 |
| 2005/0040789 | A1 * | 2/2005 | Salasoo | B60L 58/26 |
| | | | | 320/119 |
| 2006/0232240 | A1 * | 10/2006 | Salasoo | B60L 58/26 |
| | | | | 320/119 |
| 2007/0145953 | A1 * | 6/2007 | Asai | G01R 31/367 |
| | | | | 320/149 |
| 2007/0236183 | A1 * | 10/2007 | Darilek | H02J 7/0047 |
| | | | | 320/132 |
| 2008/0224667 | A1 * | 9/2008 | Tanaka | H01M 10/48 |
| | | | | 320/137 |
| 2009/0001927 | A1 * | 1/2009 | Stamos | H02J 7/0047 |
| | | | | 340/636.2 |
| 2010/0019729 | A1 * | 1/2010 | Kaita | B60L 50/16 |
| | | | | 320/134 |
| 2010/0070220 | A1 * | 3/2010 | Darilek | H02J 7/0071 |
| | | | | 324/427 |
| 2010/0134065 | A1 * | 6/2010 | Iida | H01M 10/44 |
| | | | | 320/132 |
| 2010/0214108 | A1 * | 8/2010 | Stamos | H02J 7/0072 |
| | | | | 320/134 |
| 2010/0256936 | A1 * | 10/2010 | Darilek | G01R 31/3828 |
| | | | | 324/427 |
| 2010/0327810 | A1 * | 12/2010 | Jimbo | H01M 10/121 |
| | | | | 320/126 |
| 2011/0050239 | A1 * | 3/2011 | Hoshino | G06Q 30/06 |
| | | | | 324/435 |

(56) References Cited

U.S. PATENT DOCUMENTS

| | | | | |
|---|---|---|---|---|
| 2011/0175571 A1* | 7/2011 | Renken | H02J 7/00714 | 320/112 |
| 2011/0309799 A1* | 12/2011 | Firehammer | H02J 7/0016 | 320/128 |
| 2012/0065824 A1* | 3/2012 | Takahashi | G01R 31/367 | 903/903 |
| 2012/0098489 A1* | 4/2012 | Arai | B60L 3/0046 | 320/109 |
| 2012/0248876 A1* | 10/2012 | Tamura | G01R 31/392 | 307/66 |
| 2012/0262106 A1* | 10/2012 | Omiya | B60R 16/03 | 320/104 |
| 2012/0293114 A1* | 11/2012 | Murochi | H02J 7/00716 | 320/134 |
| 2013/0038333 A1* | 2/2013 | Harada | H01M 10/48 | 324/431 |
| 2013/0103355 A1* | 4/2013 | Unagami | B60L 58/12 | 702/187 |
| 2013/0113426 A1* | 5/2013 | Arai | B60L 50/64 | 320/109 |
| 2013/0138370 A1 | 5/2013 | Oh et al. | | |
| 2013/0314050 A1* | 11/2013 | Matsubara | H02J 7/0077 | 320/134 |
| 2014/0162091 A1* | 6/2014 | Hatta | H02J 3/32 | 429/50 |
| 2014/0225570 A1* | 8/2014 | Suga | H01M 10/486 | 320/134 |
| 2014/0239908 A1* | 8/2014 | Ichikawa | H02J 7/0016 | 320/134 |
| 2014/0320087 A1* | 10/2014 | Takahashi | H01M 10/443 | 320/134 |
| 2014/0354239 A1* | 12/2014 | Miyazaki | H02J 7/04 | 320/134 |
| 2015/0042289 A1* | 2/2015 | Yoshida | H02J 7/008 | 320/136 |
| 2015/0188350 A1* | 7/2015 | Deboy | H02J 3/28 | 320/128 |
| 2015/0283912 A1* | 10/2015 | Shimizu | B60L 53/665 | 320/157 |
| 2015/0314699 A1* | 11/2015 | Wakasugi | B60L 7/14 | 320/134 |
| 2016/0064957 A1 | 3/2016 | Card et al. | | |
| 2016/0204625 A1* | 7/2016 | Josephs | H02J 7/0013 | 320/139 |
| 2016/0259012 A1* | 9/2016 | Sejima | G01R 31/367 | |
| 2017/0025867 A1* | 1/2017 | Wang | H02J 7/007182 | |
| 2017/0047745 A1* | 2/2017 | Chambon | G01R 31/382 | |
| 2017/0131360 A1* | 5/2017 | Kawahara | H02J 7/00 | |
| 2017/0141444 A1* | 5/2017 | Kawahara | G01R 31/3828 | |
| 2017/0176544 A1* | 6/2017 | Shimizu | G01R 31/392 | |
| 2017/0214266 A1* | 7/2017 | Takahashi | G01R 31/392 | |
| 2017/0282745 A1* | 10/2017 | Kawamura | H02J 7/0021 | |
| 2017/0285109 A1* | 10/2017 | Kawamura | G01R 31/382 | |
| 2017/0288425 A1* | 10/2017 | Fukushima | H02J 7/0048 | |
| 2017/0292990 A1* | 10/2017 | Kawamura | G01R 31/2829 | |
| 2017/0338465 A1* | 11/2017 | Holme | C25D 3/00 | |
| 2018/0198161 A1* | 7/2018 | Krasovitsky | H02J 7/04 | |
| 2018/0203071 A1* | 7/2018 | Takemura | H01M 10/48 | |
| 2018/0205236 A1* | 7/2018 | Fu | H02J 7/007188 | |
| 2018/0301749 A1* | 10/2018 | Krasovitsky | H02J 7/045 | |
| 2018/0366957 A1* | 12/2018 | Hale | G01R 31/387 | |
| 2019/0025377 A1* | 1/2019 | Sejima | B60L 50/66 | |
| 2019/0072618 A1 | 3/2019 | Ghantous et al. | | |
| 2019/0120910 A1* | 4/2019 | Ghantous | H02J 7/0047 | |
| 2019/0137573 A1* | 5/2019 | Hatano | H01M 10/48 | |
| 2019/0157896 A1* | 5/2019 | Cha | H02J 7/007192 | |
| 2019/0237974 A1* | 8/2019 | Dang | H02J 7/007 | |
| 2019/0339330 A1* | 11/2019 | Bryngelsson | G01R 31/367 | |
| 2019/0359066 A1* | 11/2019 | Duan | H01M 50/20 | |
| 2020/0119411 A1* | 4/2020 | Krasovitsky | H02J 7/005 | |
| 2020/0136399 A1* | 4/2020 | Akaishi | H02J 7/0047 | |
| 2020/0153263 A1* | 5/2020 | Akaishi | H02J 7/0086 | |
| 2020/0220225 A1* | 7/2020 | Lemke | H01M 10/44 | |
| 2021/0020897 A1* | 1/2021 | Holme | C25D 5/18 | |
| 2021/0057930 A1* | 2/2021 | Akaishi | G01R 31/367 | |
| 2021/0088590 A1* | 3/2021 | Takahashi | G01R 31/389 | |
| 2021/0148987 A1* | 5/2021 | Ghantous | G01R 31/392 | |
| 2021/0152010 A1* | 5/2021 | Nagai | H02J 7/00712 | |
| 2021/0296627 A1* | 9/2021 | Holme | H01M 10/0585 | |
| 2021/0296908 A1* | 9/2021 | Berkowitz | H02J 7/0071 | |
| 2021/0319152 A1* | 10/2021 | Couture | G06Q 50/06 | |
| 2021/0336239 A1* | 10/2021 | Holme | H01M 10/0585 | |
| 2022/0006308 A1* | 1/2022 | Zhang | B60L 3/0069 | |
| 2022/0085621 A1* | 3/2022 | Akaishi | H02J 7/007186 | |
| 2022/0190623 A1* | 6/2022 | Fu | H01M 10/425 | |
| 2022/0209547 A1* | 6/2022 | Peng | H01M 10/425 | |
| 2022/0224135 A1* | 7/2022 | Matsumura | H02J 7/0048 | |
| 2022/0317198 A1* | 10/2022 | Ghantous | H01M 10/44 | |
| 2023/0006271 A1* | 1/2023 | Ghantous | H01M 10/44 | |

FOREIGN PATENT DOCUMENTS

| | | |
|---|---|---|
| CN | 110828924 A | 2/2020 |
| CN | 111273180 A | 6/2020 |
| CN | 111279573 A | 6/2020 |
| JP | 2009199936 A | 3/2009 |
| JP | 2009199936 A | 9/2009 |

OTHER PUBLICATIONS

Extended European Search Report of Application No. 21731876.5 1202 PCT/CN2021076274, dated Apr. 8, 2022.

First Office Action for EP Application No. 21731876.5, dated Dec. 23, 2022, 8 pages.

Anakiraman Umamaheswari et al: "Review-Lithium Plating Detection Methods in Li-Ion Batteries", Journal of The Electrochemical Society Open Access, vol. 167, Jan. 1, 2020 (Jan. 1, 2020), p. 160552, XP055983139.

Ringbeck Florian et al: "Identification of Lithium Plating in Lithium-Ion Batteries by Electrical and Optical Methods", Journal of The Electrochemical Society, Jan. 1, 2020 (Jan. 1, 2020), vol. 167, p. 090536, XP055983140.

Written Opinion for International Application No. PCT/CN2021/076274, dated Oct. 14, 2021, 4 pages.

Second Office Action for EP Application No. 21731876.5, dated Jun. 13, 2023, 8 pages.

* cited by examiner

BATTERY CONTROLLER AND METHOD FOR SUPPRESSION OF LITHIUM PLATING DURING CHARGING

CROSS-REFERENCE TO RELATED APPLICATIONS

This application is a continuation of International Patent Application No. PCT/CN2021/076274, filed on Feb. 9, 2021, which is incorporated herein by reference in its entirety.

TECHNICAL FIELD

This application relates to the battery field, and in particular, to a battery charging method, a controller, a battery management system, a battery, and an electric device.

BACKGROUND

Wide application of lithium-ion batteries in the fields such as new energy vehicles and energy storage imposes higher requirements on charge speed of the lithium-ion batteries.

Higher charge speed of the batteries leads to increasingly higher charge rates of the batteries. A higher charge rate of a battery leads to severer polarization of the battery and heavy packing of lithium ions on a surface of a negative electrode. In a charge process, a potential of the negative electrode is significantly lower and closer to a 0 V potential for lithium plating, thereby greatly increasing risks of lithium plating during charging. After lithium plating occurs on the negative electrode, precipitated lithium dendrites may react with an electrolytic solution to locally generate a large amount of heat or pierce a separator of the battery, thereby short-circuiting a positive electrode and the negative electrode or even causing a fire and explosion of the battery. This is a significant threat to safety of the batteries for use today and in the future. Therefore, how to suppress the lithium plating of the batteries during the charging is an urgent technical problem to be solved currently.

SUMMARY

This application discloses a battery charging method, a controller, a battery management system, a battery, and an electric device to suppress lithium plating of the battery.

According to a first aspect of this application, a battery charging method is provided, including: obtaining an electrical parameter of a battery; determining whether the electrical parameter of the battery reaches a preset threshold, where a value range of the preset threshold meets the following condition: a battery state of charge (SOC) corresponding to the preset threshold is 70% to 80%; suspending, when the electrical parameter of the battery reaches the preset threshold, charging of the battery and, discharging the battery for a duration of t; and continuing to charge the battery when the discharge is completed.

In the technical solution provided in some embodiments of this application, the preset threshold of the electrical parameter is set. When the battery SOC reaches the preset threshold, the charge is suspended and the discharge is performed, thereby suppressing lithium plating of the battery and improving safety performance of the battery. In addition, the value range of the preset threshold meets the condition that the battery state of charge (SOC) corresponding to the preset threshold is 70% to 80%. The preset threshold selected within such a range can achieve better effects of suppressing lithium plating of the battery on a basis of minimizing impact on a charge duration.

In some embodiments, a negative electrode material of the battery includes graphite, and the electrical parameter is SOC.

For a battery that uses graphite as the negative electrode material, a voltage charging curve includes a jump phase and a steady phase in a charge process. If voltage is used as the electrical parameter, whether the electrical parameter of the battery reaches the preset threshold cannot be accurately determined at the voltage steady phase. In this embodiment, SOC is used as the electrical parameter, so that the foregoing disadvantage can be overcome, and whether the electrical parameter of the battery reaches the preset threshold can be accurately determined. This can further suppress lithium plating of the battery and improve safety performance of the battery.

In some embodiments, at a voltage jump phase in a charge process of the battery, the electrical parameter is voltage. At a voltage steady phase in the charge process of the battery, the electrical parameter is SOC.

In such embodiments, at the voltage jump phase in the charge process of the battery, voltage is used as the electrical parameter; and at the voltage steady phase, the electrical parameter is not the voltage that lacks a relatively great rangeability, but is the SOC instead. This can overcome the disadvantage of inability to accurately determine, based on the voltage at the voltage steady phase, whether the electrical parameter of the battery reaches the preset threshold, in this way, whether the electrical parameter of the battery reaches the preset threshold can be accurately determined, lithium plating of the battery can be further suppressed, and safety performance of the battery is improved.

In some embodiments, the preset threshold includes a first preset threshold and a second preset threshold. A value range of the first preset threshold meets the following condition: a SOC corresponding to the first preset threshold is 35% to 45%. A value range of the second preset threshold meets the following condition: a SOC corresponding to the second preset threshold is 70% to 80%.

By using two different preset thresholds, the battery may be discharged for a first time when the battery reaches the SOC corresponding to the first preset threshold. This ensures that lithium precipitated at an early phase of charging for reasons such as unreasonable current design or an actual current in excess of a requested current are intercalated hack into a positive active material in time in a discharge process, and reduces an accumulated amount of lithium plating. Considering requirements of a fast-charge battery, rate design, and characteristics such as change in a potential of a negative electrode comprehensively, the SOC corresponding to the first preset threshold of the first-time discharge is set to the range of 35% to 45%, and this can achieve better effects of helping to intercalate the precipitated lithium metal back and suppressing continuous growth of lithium dendrites. The battery is discharged for a second time when the battery reaches the SOC corresponding: to the second preset threshold. This can further suppress lithium plating of the battery at middle and late phases of charging. In addition, the preset threshold of the second-time discharge is selected in the SOC range of 70% to 80%, thereby achieving better effects of suppressing the lithium plating of the battery, and improving the safety performance of the battery.

In some embodiments, the preset threshold includes a first preset threshold and a second preset threshold. The first preset threshold is less than the second preset threshold. The suspending, when the electrical parameter of the battery reaches the preset threshold, charging of the battery and discharging the battery for a duration of t include: suspending, when the electrical parameter of the battery reaches the first preset threshold, charging of the battery and discharging the battery for a duration of $t_1$; and suspending, when the electrical parameter of the battery reaches the second preset threshold, charging of the battery and discharging the battery for a duration of $t_2$, where $t_1 < t_2$.

Two different preset thresholds are used. When the electrical parameter of the battery reaches the higher second preset threshold, the battery is discharged for a duration of $t_2$ that is greater than the duration of $t_1$ for which the battery is discharged when the electrical parameter reaches the lower first preset threshold. In this way, when a relatively large amount of lithium is precipitated, the battery may be discharged for a longer time, so as to achieve better effects of suppressing the lithium plating of the battery and improve the safety performance of the battery.

In some embodiments, the method further includes: determining whether the electrical parameter of the battery meets a charge stop condition; stopping charging when the electrical parameter of the battery meets the charge stop condition; determining whether the electrical parameter of the battery reaches the preset threshold, where the value range of the preset threshold meets the following condition: the SOC corresponding to the preset threshold is 70% to 80%; and discharging the battery for the duration of t when the electrical parameter of the battery reaches the preset threshold.

In this way, after the charging stops, whether the electrical parameter of the battery reaches the preset threshold is determined again, a preset threshold is selected in the range of 70% to 80% of the SOC corresponding to the preset threshold, and the battery is discharged if the electrical parameter reaches this preset threshold. The battery can be discharged when the lithium plating of the battery needs to be suppressed after the charging stops, thereby achieving better effects of suppressing the lithium plating of the battery.

According to a second aspect of this application, a battery charging controller is provided, including one or more processors. The processors work individually or jointly, and the processors are configured to perform steps of the battery charging method described in the first aspect above.

According to a third aspect of this application, a battery management system is provided, including: at least one processor; and a memory connected in communication to the at least one processor. The memory stores an instruction executable by the at least one processor. The instruction is executed by the at least one processor so that the at least one processor implements steps of the battery charging method described in the first aspect above.

According to a fourth aspect of this application, a battery is provided, including: the battery charging controller described in the second aspect above, or the battery management system described in the third aspect above.

According to a fifth aspect of this application, an electric device is provided, including the battery described in the fourth aspect above. The battery is configured to provide electrical energy.

BRIEF DESCRIPTION OF DRAWINGS

The drawings described herein are intended to enable a further understanding of this application, and constitute a part of this application. The exemplary embodiments of this application and the description thereof are intended to interpret this application, but do not constitute any undue limitation on this application. In the drawings.

DETAILED DESCRIPTION OF EMBODIMENTS

Figure 1:
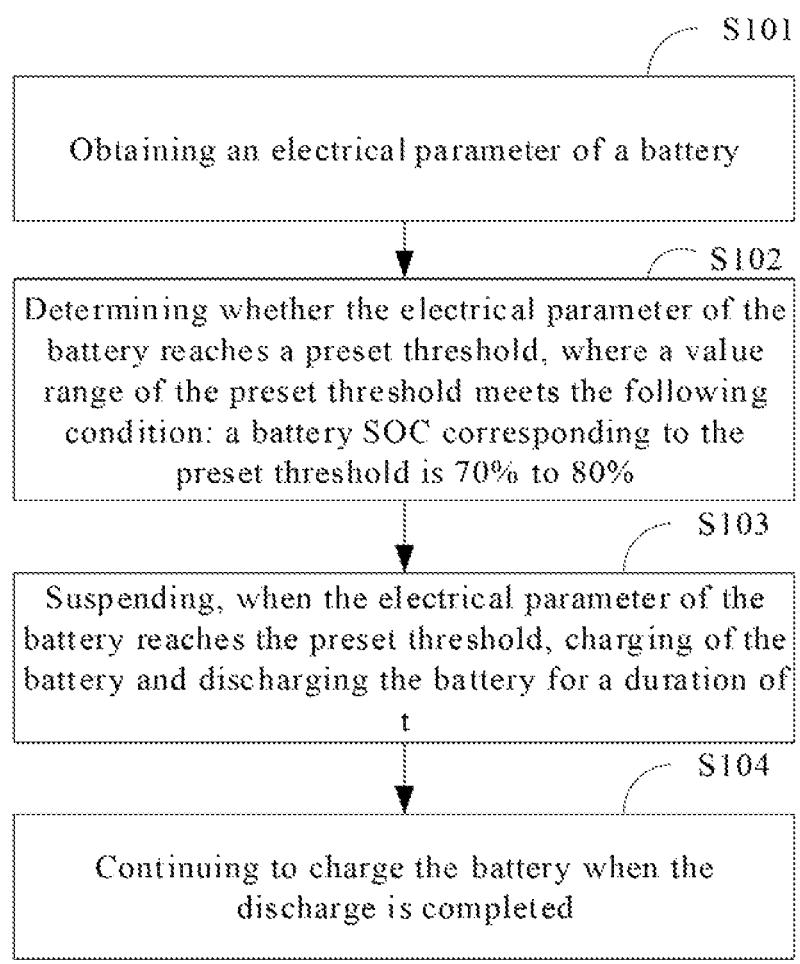
FIG. 1 is a schematic flowchart of a battery charging method according to some embodiments of this application.

To make the objectives, technical solutions, and advantages of the embodiments of this application clearer, the following gives a clear and complete description of the technical solutions in the embodiments of this application with reference to the drawings in the embodiments of this application. Apparently, the described embodiments are merely a part of but not all of the embodiments of this application. All other embodiments derived by a person of ordinary skill in the art based on the embodiments of this application without making any creative efforts fall within the protection scope of this application.

Unless otherwise defined, all technical and scientific terms used herein have the same meanings as usually understood by a person skilled in the technical field of this application. The terms used in the specification of this application are merely intended for describing specific embodiments but axe not intended to limit this application. The terms "include" and "contain" and any variations thereof used in the specification, claims, and brief description of drawings of this application are intended as non-exclusive inclusion. The terms such as "first" and "second" used in the specification, claims, and brief description of drawings of this application are intended to distinguish different objects, but are not intended to describe a specific sequence or order of priority. In the context of this application, unless otherwise specified, "a plurality of" means two or more.

Reference to "embodiment" in this application means that a specific feature, structure or characteristic described with reference to the embodiment may be included in at least one embodiment of this application. The reference to this term in different places in the specification does not necessarily represent the same embodiment, nor does it represent an independent or alternative embodiment in a mutually exclusive relationship with other embodiments. A person skilled in the art explicitly and implicitly understands that the embodiments described in this application may be combined with other embodiments.

As mentioned above, it needs to be emphasized that the term "include/comprise" used w this specification is intended to explicitly indicate the existence of the mentioned feature, integer, step or component, but does not exclude the existence or addition of one or more other features, integers, steps, or components, or a group of features, integers, steps, or components. Unless otherwise expressly specified in the context, a noun in the singular form preceded by "a", "an", or "the" as used in this application also includes the plural form thereof.

The terms "a" and "an" in this specification may mean one, but may also have the same meaning as "at least one" or "one or more". The term "approximately" qualifying a numerical value generally means the numerical value plus or minus 10% thereof, or more specifically, plus or minus 5% thereof. Unless expressly indicating only an alternative solution, the term "or" used in the claims means "and/or".

The term "and/or" in this application indicates merely a relation for describing the related objects, and represents three possible relationships. For example, "A and/or B" may represent the following three circumstances: A alone, both A and B, and B alone. In addition, the character "l" herein generally indicates an "or" relationship between the object preceding the character and the object following the character.

Batteries mentioned in this field may be classed into a primary battery and a rechargeable battery depending on rechargeability. The primary battery is informally known as a "disposable" battery or a galvanic battery because the battery is not rechargeable and has to be discarded after consumption of electrical power. A rechargeable battery is also called a secondary battery, secondary cell, or storage battery. A material for and a process of manufacturing a rechargeable battery are different from those of a primary battery. An advantage of the rechargeable battery is that the battery can be used for a plurality of cycles after being charged. An output current load capacity of the rechargeable battery is higher than that of most primary batteries. Currently, common types of rechargeable batteries include: lead-acid battery, nickel-metal hydride battery, and lithium-ion battery. The lithium-ion battery exhibits advantages such as a light weight, a high capacity (the capacity is 1.5 to 2 times that of a nickel-metal hydride battery of the same weight), and no memory effect, and exhibits a very low self-discharge rate. Therefore, despite relative expensiveness, the lithium-ion battery is widely applied. The lithium-ion battery is also applied to pure electric vehicles and hybrid vehicles. The lithium-ion battery for use in such vehicles exhibits a relatively low capacity, but a relatively high output current and charge current and a relatively long life, but involves a relatively high cost.

The battery described in the embodiments of this application means a rechargeable battery. The following describes the conception of this application using a lithium-ion batter as an example. Understandably, this application is applicable to any other suitable types of rechargeable batteries. The battery mentioned in the embodiments of this application means a stand-alone physical module that includes one or more battery cells (briefly known as cells) to provide higher voltage and higher capacity. For example, the battery mentioned in this application may include a battery module, a battery pack, or the like. A battery cell includes a positive electrode plate, a negative electrode plate, an electrolytic solution, and a separator, and is a basic structural unit of a battery module and a battery pack. Commonly used positive electrode materials of the lithium-ion battery include cobaltate, lithium manganate, lithium nickelate, lithium iron phosphate, a ternary material (such as lithium nickel cobalt manganate), and the like. Commonly used negative electrode materials include a carbon material (such as graphite), a silicon-based material, and the like. Commonly used separator materials include a polyolefin material, typically, polyethylene (PE) or polypropylene (PP). Depending on the form of packaging, battery cells are generally classed into three types: cylindrical battery cell, prismatic battery cell, and pouch-type battery cell.

A plurality of battery cells may be connected together in series and/or in parallel through electrode terminals, so as to be applied in various scenarios. In some high-power application scenarios such as electric vehicles, the use of a battery covers three levels: a battery cell, a battery module, and a battery pack. The battery module is formed by electrically connecting a specific quantity of battery cells together and putting the battery cells into a frame, so as to protect the battery cells from external impact, heat, vibration, and the like. The battery pack is a final state of a battery system mounted in an electric vehicle. Currently, most of battery packs are made by assembling various control and protection systems such as a battery management system (BMS) and a thermal management part on one or more battery modules. With advancement of technologies, the level of the battery module is omissible. That is, a battery pack is directly formed from battery cells. This improvement significantly decreases the quantity of parts while enhancing a gravimetric energy density and a volumetric energy density of the battery system. Reference to a battery in this application includes a battery module or a battery pack.

Wide application of lithium-ion batteries in the fields such as new energy vehicles and energy storage imposes higher requirements on charge speed of the lithium-ion batteries. For a lithium-ion battery that uses graphite as a main negative electrode material, increase in the charge speed of the battery means a higher charge rate. This will cause heavy packing of lithium ions on a surface of the graphite, aggravate battery polarization, and increase risks of lithium plating during charging. Lithium dendrites precipitated on a surface of a negative electrode may pierce a separator of the battery, lead to a short circuit between a positive electrode and the negative electrode or even cause a fire and explosion of the battery, thereby reducing safety performance of the battery. Therefore, how to suppress the lithium plating of the batteries during the charging is an urgent technical problem to be solved currently.

Currently, the battery polarization is suppressed and a probability of lithium plating during charging is reduced primarily by means of improving a chemical system of the battery or reducing the charge rate or the like. The means of improving the chemical system of the battery increases production cost, and the means of reducing the charge rate is at the cost of a longer charge duration, thereby affecting user experience severely.

It is found that accumulation of battery polarization can be reduced by introducing discharge in a charge process. The discharge helps to intercalate precipitated lithium metal back, and suppresses continuous accumulation of the precipitated lithium metal. This method is cost-effective and highly efficient in suppressing lithium plating, without a need to greatly reduce the charge rate. This method can improve safety performance of an electric device on a basis of ensuring high performance of the electric device.

Theoretically, considering a rule that a potential of the negative electrode decreases with the increase of a state of charge (SOC) of the battery, best effects of suppressing the lithium plating of the battery can be achieved if the battery is discharged when the state of charge of the battery is 100% or when the SOC corresponding to a voltage of the battery (or a maximum voltage of battery pack) is 100%.

However, alter conducting a lot of research and experiments, it is found that the foregoing method actually cannot achieve the best effects of suppressing the lithium plating of the battery. Specifically, when the battery is fast changed, an upper-limit SOC of the fast charge is generally 80%. A rate of the battery cell is low when the SOC is higher than 80%. Therefore, actually the most hazardous SOC for lithium plating during the fast charge of the battery is 80% or lower. Considering the rule that the potential of the negative electrode of the battery using graphite as the negative electrode decreases with the increase of the SOC, and considering a characteristic that a fast charge capability of a lithium battery is high when the SOC is low, a hazardous SOC range for lithium plating during fast charge is 70% to 80%, and secondly, is less than 70%.

To ensure that the precipitated metallic lithium is intercalated back into the positive electrode in time by means of discharge, timing of introducing the discharge in the charge process needs to be set properly. If the discharge is introduced early or after completion of the charge, the charge duration will be prolonged without enhancing charge safety significantly. It is a very difficult technical problem for researchers and those skilled in the art to achieve the best effects of suppressing the lithium plating of the battery on the basis of minimizing the impact on the charge duration.

To solve or at least partially solve the foregoing problem and other latent problems of the battery in the prior art, this application discloses a battery charging method, a controller, a battery management system, a battery, and an electric device, the design of which will be expounded in detail below. Understandably, the battery charging method, the controller, the batter management system, and the battery described in the embodiments of this application are applicable to various devices that use a battery, for example, a mobile phone, a portable device, a notebook computer, an electric power cart, an electric vehicle, a ship, a spacecraft, an electric toy, an electric tool. For example, the spacecraft includes an airplane, a rocket, a space shuttle, a spaceship, and the like. The electric toy includes a fixed or mobile electric toy, such as a game console, an electric car toy, an electric ship toy, an electric airplane toy, and the like. The electric tool includes an electric tool for metal cutting, an electric grinding tool, an electric assembly tool, an electric tool for railways, such as an electric drill, an electric grinder, an electric wrench, an electric screwdriver, an electric hammer, an electric impact drill, a concrete vibrator, and an electric planer. The electric device also includes the various devices mentioned above.

The battery charging method, the controller, the battery management system, the battery, and the electric device described in the embodiments of this application are not only applicable to the devices described above, but also applicable to all devices that use a battery. However, for brevity, the following embodiments are described by using an electric vehicle as an example.

FIG. 1 is a schematic flowchart of a battery charging method according to some embodiments of this application. The battery charging method 100 is applicable to a battery, and further, is applicable to a BMS of the battery. The following describes the conception of this application by using au example in which the method is applied to a BMS of a battery. The battery charging method includes the following steps:

S101: obtaining an electrical parameter of a battery;

S102: determining whether the electrical parameter of the battery reaches a preset threshold, where a value range of the preset threshold meets the following condition: a battery SOC corresponding to the preset threshold is 70% to 80%;

S103: suspending, when the electrical parameter of, the battery reaches the preset threshold, charging of the battery and discharging the battery for a duration of t; and S104: continuing to charge the battery when the discharge is completed.

In the embodiments of this application, the electrical parameter of the battery includes various parameters used to represent electrical status of the battery, such as SOC, voltage, and charging step character. A correspondence may exist between the electrical parameters. For example, a voltage of the battery at a first SOC is a first voltage, and a voltage at a second SOC is a second voltage. Therefore, the SOC corresponding to the first voltage is the first SOC, and the SOC corresponding to the second voltage is the second SOC. Charging step characters are identified primarily based on a node that needs to switch a charge rate, where the node is given based on characteristics of a battery cell. For example, if the battery is charged from 0% SOC to 10% SOC at a rate C1, then 0-10% SOC is a first step in the charging step characters, and a SOC range corresponding to the first step of charging is 0-10%, in the embodiments of this application, merely one electrical parameter may be selected as an electrical parameter that needs to be obtained in step S101 in the entire charge process, and the determining in step S102 is performed based on the electrical parameter. Alternatively, at different phases of the charge process, different electrical parameters may be selected as the electrical parameters that need to be obtained in step S101, and the determining in step S102 is performed based on the electrical parameters. This will be described in detail later.

The voltage may be directly obtained by a voltage sensor or a voltage sampling chip. Alter the voltage of the battery is obtained, other electrical parameter values corresponding to the voltage may be obtained based on the correspondence between the voltage and other electrical parameters. For example, a table of correspondences between the electrical parameters may be preset in the BMS. After the voltage is detected by the voltage sensor or the voltage sampling chip, the SOC or the charging step character corresponding to the voltage may be obtained by looking up in the table. Understandably, at different battery temperatures, the same SOC corresponds to different voltages. Therefore, it is necessary to add a temperature condition of the battery into the correspondence table, and set a table of correspondences between the SOC, the temperature, and the voltage.

As mentioned above, the timing of introducing the discharge in the charge process is critical, and an appropriate discharge time point needs to be set. In the embodiments of this application, a preset threshold of the electrical parameter of the battery is set, and the time point of introducing the discharge arrives when the electrical parameter reaches the preset threshold. A value range of the preset threshold needs to meet the following condition: the battery SOC corresponding to the preset threshold is 70% to 80%. As mentioned above, the hazardous SOC range for plating during fast charge is 70% to 80%, When the battery is in the hazardous SOC for lithium plating during fast charge, discharge introduced in time can achieve better effects of suppressing lithium plating of the battery on a basis of minimizing impact on the charge duration.

If SOC is selected as an electrical parameter that needs to be obtained and determined, the value range of the preset threshold of the SOC is 70% to 80%, If voltage is selected as an electrical parameter that needs to be obtained and determined, the value range of the preset threshold of the voltage is: the battery SOC corresponding to the voltage is 70% to 80%, that is, the value range in which the corresponding voltage falls when the battery SOC is in the range of 70% to 80%, If the charging step character is selected as the electrical parameter that needs to be obtained and determined, the value range of the preset threshold of the charging step character is: the battery SOC corresponding; to the charging step character is 70% to 80%, that is, the value range in which the corresponding charging step character falls when the battery SOC is in the range of 70% to 80%. The foregoing interpretation may serve as a reference for the value range of the preset threshold to be mentioned below.

Understandably, step S101 is performed after start of charging the battery. The electrical parameter of the battery may be obtained in a real-time and uninterrupted manner, or the electrical parameter may be obtained at preset time intervals, or a start time of obtaining the electrical parameter of the battery may be set based on a preset threshold. For example, if the electrical parameter is SOC and the preset threshold is 80%, a preset start time T may be set. T is a calculated estimated time point at which the SOC reaches 80% in this charge process. Therefore, the obtaining of the electrical parameter of the battery may be started at the time T. In this way, compared with the obtaining, method in which the obtaining of the SOC is started at a time point before the time T but with the SOC not reaching 80% at the time point, the foregoing method can save system resources. The time T is merely an estimated charge time point. Therefore, in an actual charge process, it is possible that the actual charge time point at which the SOC reaches 80% is earlier than. T or later than T. In a case that the actual charge time point at which the SOC reaches 80% is later than T, it is also appropriate to set a start time of obtaining the electrical parameter to T. This is equivalent to obtaining the electrical parameter some time in advance. In a case that the actual charge time at which the SOC reaches 80% is earlier than T, the start time of obtaining the electrical parameter of the battery may be advanced correspondingly. Therefore, in other embodiments, the obtaining of the electrical parameter of the battery may be started at time $(T-T_1)$, where $T_1$ may be a maximum floating difference against the actual charge time point at which the SOC reaches 80%, as determined based on calculation or empirical statistics.

When the electrical parameter of the battery reaches the preset threshold, the BMS may suspend charging of the battery and discharge the battery. In the embodiments of this application, an electrical circuit that exists in the electric device or the battery may be used for discharging. In this way, the discharge can be performed by using the inherent electrical circuit of the electric device without a need to change an electrical structure of the electric device or a charging device, thereby reducing difficulty and cost of engineering applications. For an electric vehicle, discharge can be implemented without a need to change an electrical structure of an integrated vehicle or a charging pile. A discharge circuit may be implemented by, for example, discharging a battery pack toward a thermal management system, discharging a battery pack toward a balancing system, or discharging a battery pack toward the State Grid Corporation of China through an on-board charger (OBC). In such discharge manners, discharge can be controlled by the BMS. Alternatively, the discharge circuit may be implemented by discharging battery pack toward an electrical system (such as an air conditioning system) of the integrated vehicle. This discharge manner needs to be controlled by the BMS in coordination with the integrated vehicle. For example, the BMS sends a discharge packet to the integrated vehicle, and the integrated vehicle responds and starts a corresponding discharge system to discharge.

For an identical circuit, a direction of a current flowing during charging is opposite to a direction of the current flowing during discharging. In the embodiments of this application, charging means positive pulse charging, and discharging may be implemented by adding a short-time low-current negative pulse. The discharge current is generally less than 10 A. A discharge duration is set to a fixed time t. A value range of t may be t≥3 s. As required for intercalating lithium metal back, the discharge duration is greater than or equal to 3 s. This can effectively ensure that the precipitated metal lithium is intercalated back to the positive electrode in time, thereby avoiding continuous growth of lithium dendrites and safety problems arising therefrom. When the battery is discharged for a duration of t, which indicates completion of the discharge, the BMS may continue to charge the battery until completion of the charging.

In the technical solution provided in the embodiments of this application, the preset threshold of the electrical parameter is set. When the battery SOC reaches the preset threshold, the charge is suspended and the discharge is performed. Through the discharge process, the lithium metal is intercalated back to the positive electrode. In this way, continuous increase of the amount of lithium plating and continuous growth of lithium dendrites are suppressed, and safety performance of the battery is improved. This is achieved without a need to reduce the charge rate, and avoids deterioration of performance of the electric device and user experience. In addition, the value range of the preset threshold meets the condition that the battery state of charge (SOC) corresponding to the preset threshold is 70% to 80%. The preset threshold selected within such a range can achieve better effects of suppressing lithium plating of the battery.

As mentioned above, considering the rule that the potential of the negative electrode of the battery using graphite as the negative electrode decreases with the increase of the SOC, and considering the characteristic that the fast charge capability of the lithium battery is high when the SOC is low, the discharge time point is selected within at SOC range of 70% to 80%, which is a hazardous SOC range for lithium plating during fast charge. In some embodiments of this application, a negative electrode material of the battery includes graphite, and the electrical parameter is SOC.

Figure 2:
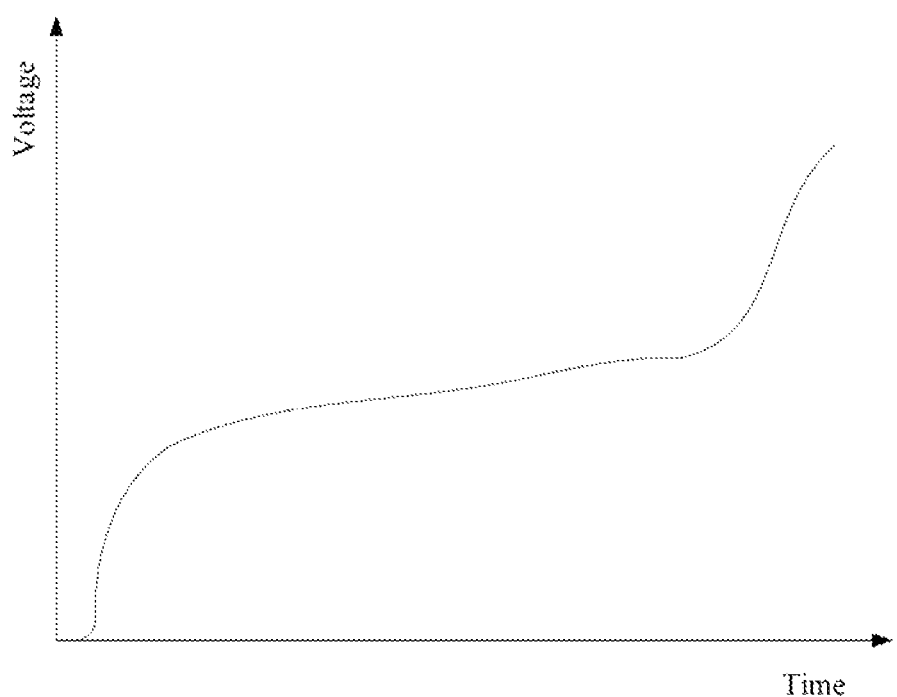
FIG. 2 is a schematic diagram of a voltage charging curve of a battery using lithium iron phosphate as a positive electrode material in a charge process.

As mentioned above, commonly used positive electrode materials of the lithium-ion battery include lithium cobaltate, lithium manganate, lithium nickelate, lithium iron phosphate, a ternary material (such as lithium nickel cobalt manganate), and the like. With different positive electrode materials, a change trend of a "time-SOC charging curve" (hereinafter referred to as a SOC curve) in a charge process of the battery is basically identical. That is, the SOC gradually increases with the increase of time. However, a "time-voltage charging curve" (hereinafter referred to as a voltage curve) differs depending on a positive electrode material. FIG. 2 is a schematic diagram of a voltage charging curve of a battery using lithium iron phosphate as a positive electrode material in a charge process. As shown in FIG. 2, in a voltage charging curve of the battery using lithium iron phosphate as the positive electrode material (hereinafter referred to as a lithium iron phosphate battery), the voltage rises quickly at an initial phase of charging thereinafter referred to as a voltage jump phase) the voltage rises steadily at a middle phase of charging thereinafter referred to as a voltage steady phase); and the voltage starts to rise quickly again at an end phase of charging (hereinafter referred to as the voltage jump phase). In a voltage charging curve of a battery using lithium cobaltate, lithium manganate, lithium nickelate or a ternary material as the positive electrode material, a rising trend is relatively equalized throughout the charge process, and the voltage gradually increases with the increase of time.

In the charge process of the lithium iron phosphate battery, the voltage charging curve includes a jump phase and a steady phase. Therefore, if the voltage is selected as the electrical parameter that needs to be obtained, because the rangeability of the voltage is relatively small at the voltage steady phase, whether the electrical parameter of the battery reaches the preset threshold cannot be accurately determined at the voltage steady phase. Based on this, in some embodiments, for the lithium iron phosphate battery, the SOC may be selected as the electrical parameter that needs to be obtained. When it is determined that the battery SOC reaches the preset threshold, the battery is discharged. By selecting, the SOC as the electrical parameter that needs to be obtained, the embodiments of this application can overcome the disadvantage exhibited when the voltage is selected as the electrical parameter that needs to be obtained, accurately determine whether the electrical parameter of the battery reaches the preset threshold, further suppress lithium plating of the battery, and improve safety performance of the battery.

In other embodiments, for the lithium iron phosphate battery, at different phases of the voltage charging curve in the charge process, different electrical parameters are selected to determine whether the preset threshold is reached. For example, at the voltage jump phase in the charge process of the battery, the voltage is selected as the electrical parameter that needs to be obtained; and at the voltage steady phase, the SOC is selected as the electrical parameter that needs to be obtained. For example, when the battery SOC corresponding to the charge duration is within a range of 0% to 20%, this duration is the voltage jump phase, and the voltage is selected as the electrical parameter. When the battery SOC corresponding to the charge duration is within a range of 20% to 80%, this duration is the voltage steady phase, and the SOC is selected as the electrical parameter. When the battery SOC corresponding to the charge duration is higher than 80%, this duration is the voltage jump phase, and the voltage is selected as the electrical parameter. In this way, at the voltage jump phase in the charge process of the battery, voltage is used as the electrical parameter; and at the voltage steady phase, the electrical parameter is not the voltage that lacks a relatively great rangeability, but is the SOC instead. This can overcome the disadvantage of inability to accurately determine, based on the voltage at the voltage steady phase, whether the electrical parameter of the battery reaches the preset threshold. In this way, whether the electrical parameter of the battery reaches the preset threshold can be accurately determined, lithium plating of the battery can be further suppressed, and safety performance of the battery is improved.

A person skilled in the art understands that the foregoing technical solution is not only applicable to lithium iron phosphate batteries, but also applicable to other batteries as long as the voltage charging curve includes a voltage jump phase and a voltage steady phase in the charge process of the batteries. That is, in the charge process of the batteries, the electrical parameter at the voltage jump phase is voltage, and the electrical parameter at the voltage steady phase is SOC.

For batteries that use lithium cobaltate, lithium manganate, lithium nickelate, or a ternary material as a positive electrode material, because the rising trend in the SOC curve and the voltage curve of the batteries are relatively equalized in the charge process of the batteries, the SOC may be selected as the electrical parameter that needs to be obtained, or the voltage may be selected as the electrical parameter that needs to be obtained, or different electrical parameters may be selected at different phases. This is not limited in this application.

Understandably, there may be one or more preset thresholds. When there is one preset threshold, the battery will be discharged for one time when the electrical parameter reaches the preset threshold in the charge process of the battery. When there are a plurality of preset thresholds, the battery will be discharged for one time whenever the electrical parameter reaches each preset threshold in the charge process of the battery. That is, steps S101 to S104 may be repeated for a plurality of dines to implement discharges for a plurality of times and achieve better effects of suppressing lithium plating of the battery.

In some embodiments, two preset thresholds may be set: a first preset threshold and a second preset threshold. A value range of the first preset threshold meets the following condition: a SOC corresponding to the first preset threshold is 35% to 45%. A value range of the second preset threshold meets the following condition: a SOC corresponding to the second preset threshold is 70% to 80%, With two different preset thresholds in use, the battery may be discharged for a first time when the battery reaches the SOC corresponding, to the first preset threshold, so that the lithium plating of the battery is suppressed at the early phase of the charge. In addition, a preset threshold of the first-time discharge is selected within a SOC range of 35% to 45%, thereby achieving better effects of suppressing lithium plating of the battery. The battery is discharged for a second time when the battery reaches the SOC corresponding to the second preset threshold. This further suppresses lithium plating of the battery at the late phase of charging. In addition, the preset threshold of the second-time discharge is selected in the SOC range of 70% to 80%, thereby achieving better effects of suppressing the lithium plating of the battery, and improving the safety performance of the battery. As required in fast charge, when the SOC is less than 40%, the rate of the battery is relatively high, a polarization potential of the negative electrode decreases sharply, and the risk of lithium plating is relatively high. Therefore, a SOC range of 35% to 45% is selected as the value range of the first preset threshold, thereby ensuring that the precipitated lithium metal is intercalated back into the positive electrode in time through the discharge process, and avoiding accumulation of metallic lithium. The principles and beneficial effects of setting the SOC range of 70% to 80% corresponding to the second preset threshold have been described in detail early above, and are omitted here.

In some optional embodiments, the SOC corresponding to the first preset threshold is optionally 40%. As required in fast charge, when the SOC is less than 40%, the rate of the battery is relatively high, the polarization potential of the negative electrode decreases sharply, and the risk of lithium plating is relatively high. The SOC corresponding to the first preset threshold is set to 40%, thereby ensuring that the precipitated lithium metal is intercalated back into the positive electrode in time through the discharge process, and avoiding accumulation of metallic lithium.

According to some optional embodiments, different discharge durations may be set depending on the preset threshold reached. When a relatively low preset threshold is reached, the lithium plating is not too heavy, and the discharge duration may be set to a relatively short time. When a relatively high preset threshold is reached, the lithium plating is relatively heavy, and the discharge duration may be set to a time longer than the discharge duration that is set when the relatively low preset threshold is reached. For example, the preset threshold includes a first preset threshold and a second preset threshold. The first preset threshold is less than the second preset threshold. When the electrical parameter of the battery reaches the first preset threshold, charging of the battery is suspended and the battery is discharged for a duration of $t_1$. When the electrical parameter of the battery reaches the second preset threshold, charging of the battery is suspended and the battery is discharged for a duration of $t_2$, where $t_1 < t_2$. Two different preset thresholds are used. When the electrical parameter of the battery reaches the higher second preset threshold, the battery is discharged for a duration of $t_2$ that is greater than the duration of $t_1$ for which the battery is discharged when the electrical parameter reaches the lower first preset threshold. In this way, when a relatively large amount of lithium is precipitated, the battery may be discharged for a longer time, so as to achieve better effects of suppressing the lithium plating of the battery and improve the safety performance of the battery.

Figure 3:
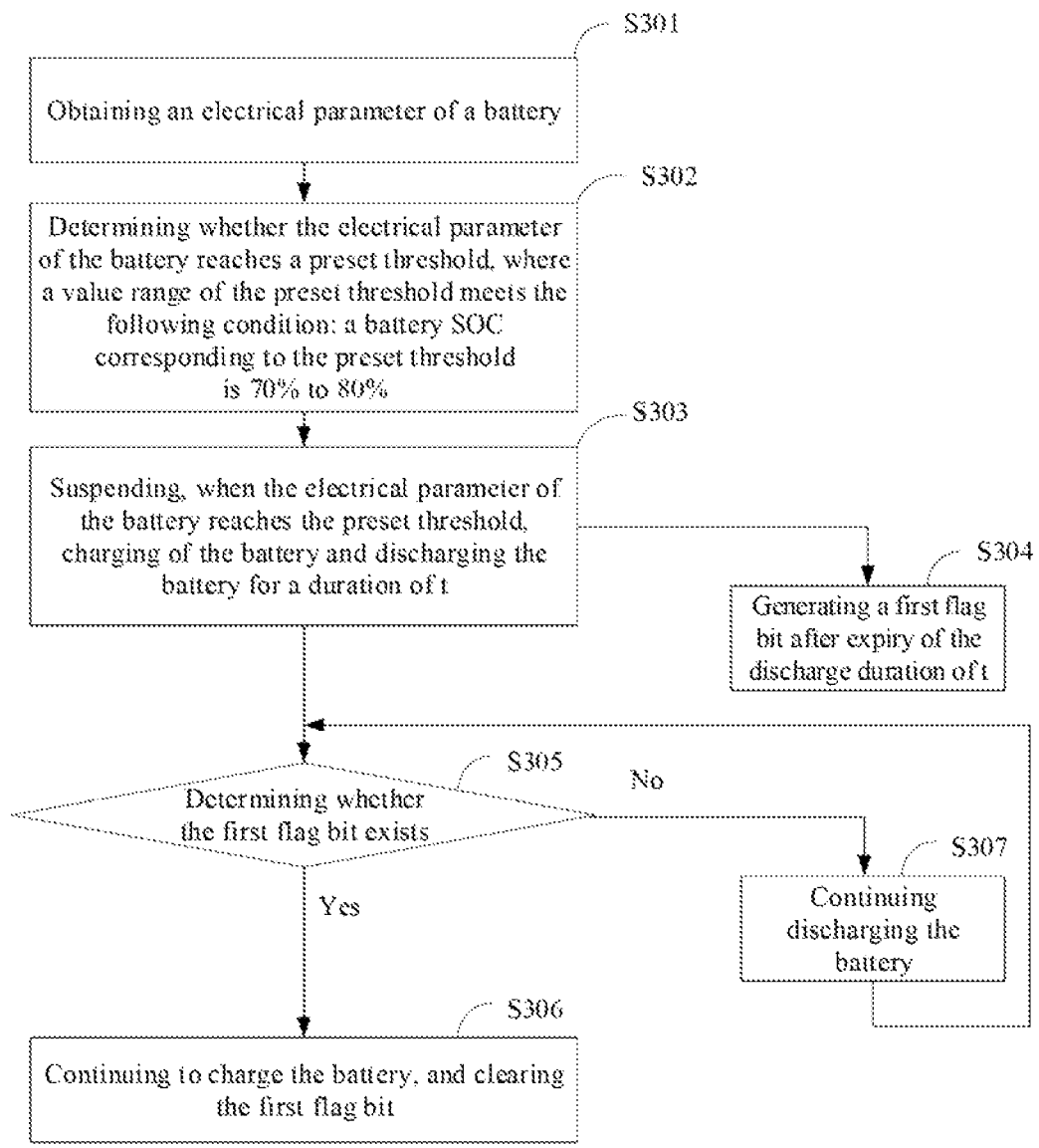
FIG. 3 is a schematic flowchart of a battery charging method according to some embodiments of this application.

Step S104 is performed upon or after completion of the discharge. To determine whether the discharge is completed, a discharge flag bit may be set to identify completion of the discharge. FIG. 3 is a schematic flowchart of a battery charging method according to some embodiments of this application. As shown in FIG. 3, in some embodiments, the method includes the following steps:

S301: obtaining an electrical parameter of a battery;

S302: determining whether the electrical parameter of the battery reaches a preset threshold, where a value range of the preset threshold meets the following condition: a battery SOC corresponding to the preset threshold is 70% to 80%;

S303: suspending, when the electrical parameter of the battery reaches the preset threshold, charging of the battery and discharging the battery for a duration of t;

S304: generating a first flag bit after expiry of the discharge duration of t;

S305: determining whether the first flag bit exists; if the first flag bit exists, the process goes to step S306; or, if the first flag bit does not exist, the process goes to step S307;

S306: continuing to charge the battery, and clearing the first flag bit; and

S307: continuing discharging the battery, and performing step S305.

The first flag bit used to indicate completion of discharging, the battery for a duration of t is generated after the battery is discharged for the duration of t. When it is determined that the first flag bit exists, it is determined that the discharge is completed, and the charging of the battery may go on, with the first flag bit being cleared. This method is relatively simple and facilitates specific implementation of software control logic. In other embodiments, the first flag bit may be pre-configured as a parameter indicating whether the battery has been discharged for a duration of t. After the battery is discharged for a duration of t, a value of the first flag bit is set to 1. When it is determined that the value of a first flag is 1, it is determined that the discharge is completed. This method is also relatively simple and facilitates specific implementation of software control logic.

The specific implementation process of steps S301 to S303 is basically the same as that of steps S101 to S103 described in the preceding embodiment. For the implementation process, reference may be made to the description given earlier above. Understandably, when there are a plurality of preset thresholds, as mentioned above, steps S401 to S407 may be repeated several times to implement repeated discharges.

Figure 4:
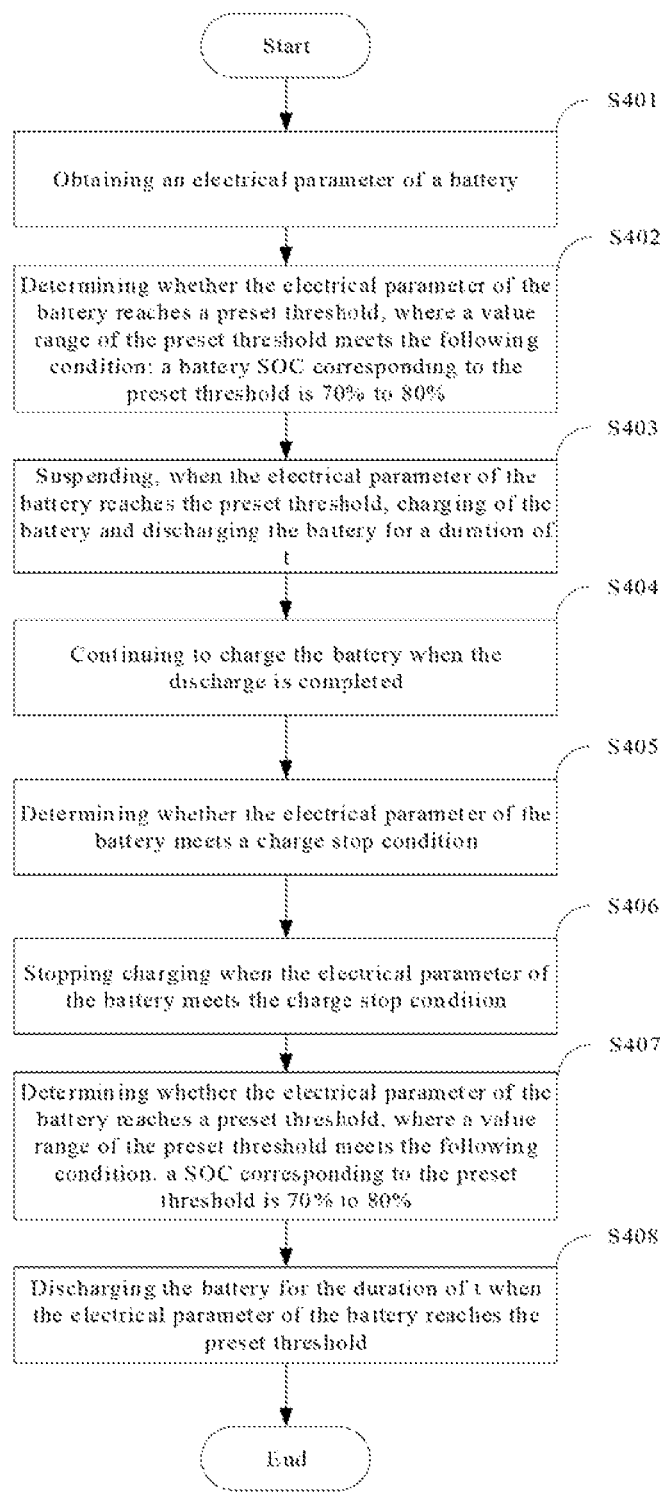
FIG. 4 is a schematic flowchart of a battery charging method according to some embodiments of this application.

After the charging stops, the battery may be overcharged and lithium plating may occur for various reasons such as control problems of a BMS and a charging pile under actual working conditions; or, the actual working conditions of charging are abnormal. Lithium plating caused by overcurrent may occur in some circumstances, for example, an input current of the charging pile is excessive, or an abnormal sampling temperature leads to an abnormal requested current. Therefore, in this case, the battery needs to be discharged fir another time. In this way, the lithium metal precipitated for various reasons is intercalated back into the positive electrode in time under the action of a negative-pulse current, and continuous growth of the lithium metal and the resulting safety hazards are avoided. FIG. 4 is a schematic flowchart of a battery charging method according to some embodiments of this application. As shown in FIG. 4, in some embodiments, the method 400 includes the following steps:

S401: obtaining an electrical parameter of a battery;

S402: determining whether the electrical parameter of the battery reaches a preset threshold, where a value range of the preset threshold meets the following condition: a battery SOC corresponding to the preset threshold is 70% to 80%;

S403: suspending, when the electrical parameter of the battery reaches the preset threshold, charging of the battery and discharging the battery for a duration of t;

S404: continuing to charge the battery when the discharge is completed;

S405: determining whether the electrical parameter of the battery meets a charge stop condition;

S406: stopping charging when the electrical parameter of the battery meets the charge stop condition;

S407: determining whether the electrical parameter of the battery reaches a preset threshold, where a value range of the preset threshold meets the following condition: a battery SOC corresponding to the preset threshold is 70% to 80%; and S408: discharging the battery for the duration of t when the electrical parameter of the battery reaches the preset threshold.

At this time, the BMS exits the charging control and completes charging.

The charge stoppage may occur in various circumstances. In a conventional charge process, a charge stop condition is generally set. For example, the charge stop condition is that the SOC reaches 100%. The charging is stopped when the SOC reaches 100%. Alternatively, the charge stop condition may be that the SOC reaches another preset value, such as 80% or 60%, or that a maximum voltage of a battery pack reaches a preset upper limit. If an electric device is disconnected from a charging power supply in a charge process, the charging will stop. For example, a charging cable connected to a mobile phone is unplugged or a charging plug connected to the power supply is unplugged during charging of the mobile phone. For another example, a charging gun of an electric vehicle is unplugged during charging. Such examples are circumstances of charge stoppage. In such circumstances, the charge stop condition may be the electric device that uses the battery is disconnected from the charging power supply.

When the electrical parameter of the battery meets the charge stop condition, the charging stops, and it is determined whether the electrical parameter of the battery reaches the preset threshold. If the electrical parameter of the battery reaches the preset threshold, the battery is controlled to discharge for a duration of t. The specific implementation process of step S401 is basically the same as that of step S101. In the preceding embodiment, the specific implementation process of steps S402 and S407 is basically the same as that of step S102 in the preceding, embodiment, the specific implementation process of steps S403 and S408 is basically the same as that of step S103 in the preceding embodiment, and the specific implementation process of step S404 is basically the same as that of step S104 in the preceding embodiment. A difference is that, because step S408 is performed after the charging is stopped, "suspending charging of the battery" in step S103 does not need to be performed in step S408. For the remaining implementation process, reference may be made to the description given earlier above.

In some embodiments, when the electrical parameter of the battery meets the charge stop condition, a second flag bit may be generated. The second flag bit is a parameter indicating fulfillment of the charge stop condition. In step S401, whether the electrical parameter of the battery meets the charge stop condition may be determined by determining whether the second flag bit exists. This method is relatively simple and facilitates specific implementation of software control logic, in other embodiments, the second flag bit may be pre-configured as a parameter indicating fulfillment of the charge stop condition. When the electrical parameter of the battery meets the charge stop condition, the second flag bit is set to 1. In step S401, whether the electrical parameter of the battery meets the charge stop condition may be determined by determining whether the second flag bit is 1. This method is also relatively simple and facilitates specific implementation of software control logic.

In this way, after the charging stops, whether the electrical parameter of the battery reaches the preset threshold is determined again, a preset threshold is selected in the range of 70% to 80% of the SOC corresponding to the preset threshold, and the battery is discharged if the electrical parameter reaches this preset threshold. The battery can be discharged when the lithium plating of the battery needs to be suppressed after the charging stops, thereby achieving better effects of suppressing the lithium plating of the battery.

The following describes a specific application process of an embodiment of this application by using the charging of an electric vehicle as an example:

1. After detecting, that a charging gun is inserted or a card is swiped, a charging pile exchanges packets with a BMS and performs pre-charging status detection to determine whether charging status is satisfied.

2. The charging pile determines that the charging status is satisfied, and sends charging mode information to the BMS in the form of a current packet. The charging mode includes a slow charge mode and fast charge mode.

3. According to the charging mode, the BMS requests, from the charging pile, a current output corresponding to the charging mode.

3.1 In a slow charge mode: the BMS requests a current according to a current packet, obtains SOC information through a SOC module of the BMS, and sends the SOC information to a charging module in the BMS. The charging module determines whether the SOC reaches the SOC specified in Table 1. If the SOC reaches the specified SOC, the BMS requests the charging pile to reduce the current to zero, and controls a preset discharge circuit to perform negative-pulse discharge for a duration corresponding to the reached SOC and listed in Table 1. After completion of the discharge, the charging module continues to request a current from the charging pile. If the SOC reaches a next preset threshold, the discharge is continued until the charge stop condition is met, whereupon the charging is completed.

TABLE 1

Preset threshold of SOC introduced by a negative pulse during slow charge, and duration

| SOC | 40% | 60% | 80% | 100% |
|---|---|---|---|---|
| Duration | 10 s | 11 s | 12 s | 13 s |

3.2 In a fast charge mode (stepwise constant-current charging): the BMS looks up in an allowable current table under different SOCs/charge rates/states of health (SOHs) (hereinafter referred to as an allowable current table) to obtain a requested current, sends the requested current to the charging pile, and records corresponding charging step characters of the battery at different voltages. When the corresponding charging step character in Table 2 is reached, the BMS requests the charging pile to reduce the current to zero, and controls the preset discharge circuit to perform negative-pulse discharge. After completion of the discharge, the charging module continues to request a current from the charging pile according to the allowable current table. After the charge stop condition is met and a steady state is achieved, the BMS requests the charging pile to reduce the current to zero, and at the same time determines whether the SOC reaches the SOC specified in Table 3. If the SOC reaches the specified SOC, the BMS requests the charging pile to reduce the current to zero and controls the preset discharge circuit to perform negative-pulse discharge for a duration corresponding to the reached SOC and listed in Table 2. After completion of the discharge, the BMS exits the charge control and completes charging.

TABLE 2

Preset threshold of charging step character introduced by a negative pulse during fast charge, and duration

| SOC | Step 1 | Step 2 | Step 3 |
|---|---|---|---|
| Duration | 10 s | 11 s | 12 s |

TABLE 3

Preset threshold of SOC introduced by a negative pulse at charge cut-off during fast charge, and duration

| SOC | 40% | 60% | 80% | 100% |
|---|---|---|---|---|
| Duration | 10 s | 11 s | 12 s | 13 s |

The following describes experiment examples.

Experiment Example 1

A 100 Ah lithium-ion battery is in use. In an original stepwise charging policy of the battery, a negative current of −3 A is introduced at each current switching point, and is maintained for a duration of 3 s. The negative current is introduced for a total of 6 times, and is maintained for a total duration of 18 s. Table 4 shows impact on the charge duration and the cycle life of the battery before and after the negative current is introduced.

TABLE 4

Impact on the charge duration and the cycle life of the battery before and after the negative current is introduced in Experiment Example 1

| Group | Charge duration (s) | Quantity of cycles corresponding to a 20% attenuation of SOH |
|---|---|---|
| Normal group | 2100 | 300 |
| HC charging | 2118 | 1200 |

As can be seen from Table 4, although the charge duration is slightly prolonged, the prolongation is short, and will not exert a major impact on user experience. However, fading of the lithium-ion battery is suppressed significantly.

Experiment Example 2

A 100 Ah lithium-ion battery is in use. A negative current of −3 A is introduced at 80% SOC and after stoppage of charging, and in each case, is maintained for a duration of 3 s. Table 5 shows impact on the charge duration and the cycle life of the battery before and after the negative current is introduced.

TABLE 5

Impact on the charge duration and the cycle life of the battery before and after the negative current is introduced in Experiment Example 2

| Group | Charge duration (s) | Quantity of cycles corresponding to a 20% attenuation of SOH |
|---|---|---|
| Normal group | 2100 | 300 |
| HC charging | 2106 | 1190 |

As can be seen from Table 5, although the charge duration is slightly prolonged, the prolongation is less than 10 s, and the impact exerted on user experience is relatively small. However, fading of the lithium-ion battery is suppressed significantly.

Figure 5:
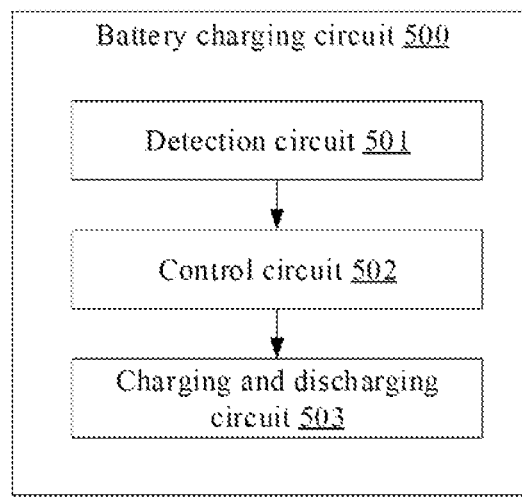
FIG. 5 is a schematic structural diagram of a battery charging circuit according to some embodiments of this application.

The battery charging method according to some embodiments of this application has been described above with reference to FIG. 1 to FIG. 4. The following describes a battery charging circuit according to embodiments of this application with reference to FIG. 5. For the content that is not described in detail, reference may be made to the preceding embodiments. FIG. 5 is a schematic structural diagram of a battery charging circuit according to some embodiments of this application. As shown in FIG. 5, the battery charging circuit 500 includes a detection circuit 501, a control circuit 502, and a charging and discharging circuit 503. The circuits are described below.

The detection circuit 501 is configured to obtain an electrical parameter of a battery.

The control circuit 502 is configured to: determine, based on the electrical parameter of the battery obtained by the detection circuit 501, whether the electrical parameter of the battery reaches a preset threshold, where a value range of the preset threshold meets the following condition: a state of charge (SOC) corresponding to the preset threshold is 70% to 80%; control, when the electrical parameter of the battery reaches the preset threshold, the charging and discharging circuit 503 to suspend charging of battery and control the charging and discharging circuit 503 to discharge the battery for a duration of t; and control, when the discharge is completed, the charging and discharging circuit 503 to continue to charge the battery.

In the technical solution provided in some embodiments of this application, the preset threshold of the electrical parameter is set. When the battery SOC reaches the preset threshold, the charge is suspended and the discharge is performed, thereby suppressing, lithium plating of the battery and improving safety performance of the battery. This is achieved without a need to reduce the charge rate, and avoids deterioration of performance of the electric device and user experience. In addition, the value range of the preset threshold meets the condition that the battery state of charge (SOC) corresponding to the preset threshold is 70% to 80%, The preset threshold selected within such a range can achieve better effects of suppressing lithium plating of the battery on a basis of minimizing impact on a charge duration.

In some embodiments, a positive electrode material of the battery is lithium iron phosphate, and the electrical parameter is SOC.

In some embodiments, the positive electrode material of the battery is lithium iron phosphate. At a voltage jump phase in a charge process of the battery, the electrical parameter is voltage. At a voltage steady phase in the charge process of the battery, the electrical parameter is SOC.

In some embodiments, the preset threshold includes a first preset threshold and a second preset threshold. A value range of the first preset threshold meets the following condition: a SOC corresponding to the first preset threshold is 35% to 45%, A value range of the second preset threshold meets the following condition: a SOC corresponding to the second preset threshold is 70% to 80%.

Figure 11:
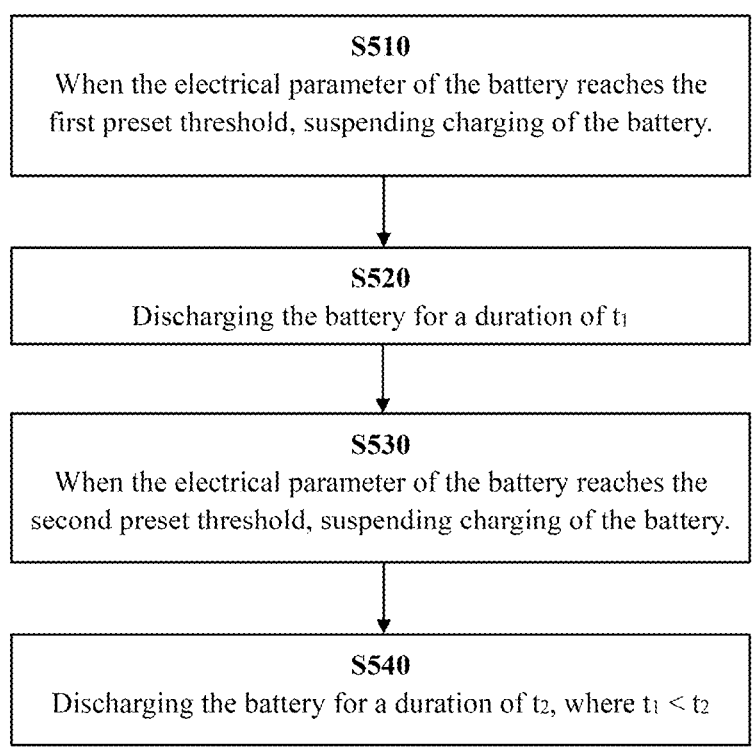
FIG. 11 is a flowchart of step S403 in FIG. 4, according to some embodiments of the present application.

In some embodiments, the preset threshold includes a first preset threshold and a second preset threshold. The first preset threshold is less than the second preset threshold. As shown in FIG. 11, the control circuit 502 is further configured to: suspend, when the electrical parameter of the battery reaches the preset threshold, charging of the battery and discharge the battery for a duration of t (S403 in FIG. 4), including: suspending, when the electrical parameter of the battery reaches the first preset threshold, charging of the battery (S510) and discharging the battery for a duration of $t_1$ (S520); and suspending, when the electrical parameter of the battery reaches the second preset threshold, charging of the battery (S530) and discharging the battery for a duration of $t_2$ (S540), where $t_1 < t_2$.

In some embodiments, the control circuit 502 is further configured to: determine whether the electrical parameter of the battery meets a charge stop condition; stop charging when the electrical parameter of the battery meets the charge stop condition; determine whether the electrical parameter of the battery reaches the preset threshold, where the value range of the preset threshold meets the following condition: the SOC corresponding to the preset threshold is 70% to 80%; and discharge the battery for the duration of t when the electrical parameter of the battery reaches the preset threshold.

Figure 6:
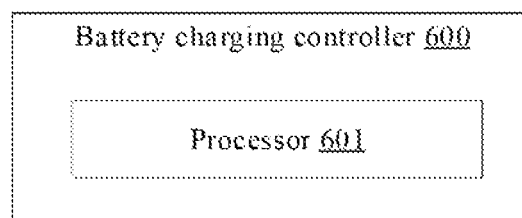
FIG. 6 is a schematic structural diagram of a battery charging controller according to some embodiments of this application.

The following describes a battery charging controller according to embodiments of this application with reference to FIG. 6. POI the content that is not described in detail, reference may be made to the preceding embodiments. FIG. 6 is a schematic structural diagram of a battery charging controller according to some embodiments of this application. As shown in FIG. 6, the battery charging controller 600 includes one or more processors 601, which work individually or jointly. The processors 601 are configured to perform steps of the battery charging method described in the preceding embodiments.

In the technical solution provided in some embodiments of this application, the preset threshold of the electrical parameter is set. When the battery SOC reaches the preset threshold, the charge is suspended and the discharge is performed, thereby suppressing lithium plating of the battery and improving safety performance of the battery. This is achieved without a need to reduce the charge rate, and avoids deterioration of performance of the electric device and user experience. In addition, the value range of the preset threshold meets the condition that the battery state of charge (SOC) corresponding to the preset threshold is 70% to 80%. The preset threshold selected within such a range can achieve better effects of suppressing lithium plating of the battery on a basis of minimizing impact on a charge duration.

Figure 7:
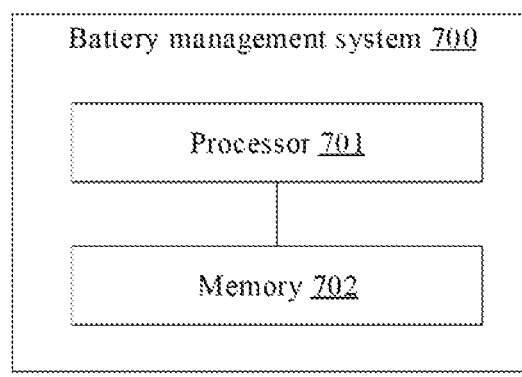
FIG. 7 is a schematic structural diagram of a battery management system according to some embodiments of this application.

The following describes a battery management system according to embodiments of this application with reference to FIG. 7. For the content that is not described in detail, reference may be made to the preceding embodiments. FIG. 7 is a schematic structural diagram of a battery management system according to some embodiments of this application. As shown in FIG. 7, the battery management system 700 includes: at least one processor 701; and a memory 702 connected in communication to the at least one processor 701. The memory 702 stores an instruction executable by the at: least one processor 701. The instruction is executed by the at least one processor 701 so that the at least one processor 701 implements steps of the battery charging method according to any one of claims 1 to 6.

In the technical solution provided in some embodiments of this application, the preset threshold of the electrical parameter is set. When the battery SOC reaches the preset threshold, the charge is suspended and the discharge is performed, thereby helping to intercalate precipitated lithium back into the positive electrode, avoiding accumulation of the amount of precipitated lithium metal and continuous growth of lithium dendrites, and improving safety performance of the battery. This is achieved without a need to reduce the charge rate, and avoids deterioration of performance of the electric device and user experience. In addition, the value range of the preset threshold meets the condition that the battery state of charge (SOC) corresponding to the preset threshold is 70% to 80%, The preset threshold selected within such a range can achieve better effects of suppressing lithium plating of the battery on a basis of minimizing impact on a charge duration.

Figure 8:
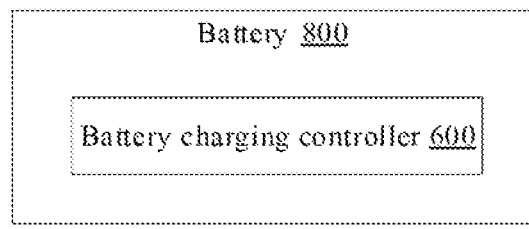
FIG. 8 is a schematic structural diagram of a battery according to some embodiments of this application.
Figure 9:
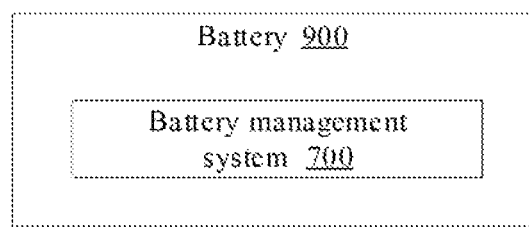
FIG. 9 is a schematic structural diagram of a battery according to some embodiments of this application.

The following describes a battery according to embodiments of this application with reference to FIG. 8 and FIG. 9. For the content that is not described in detail, reference may be made to the preceding embodiments. FIG. 8 is a schematic structural diagram of a battery according to some embodiments of this application. As shown in FIG. 8, the battery 800 includes a battery charging controller 600 according to the preceding embodiments. FIG. 9 is a schematic structural diagram of a battery according to some embodiments of this application. As shown in FIG. 9, the battery 900 includes a battery management system 700 according to the preceding embodiments.

In the technical solution provided in some embodiments of this application, the preset threshold of the electrical parameter is set. When the battery SOC reaches the preset threshold, the charge is suspended and the discharge is performed, thereby suppressing lithium plating of the battery and improving safety performance of the battery. This is achieved without a need to reduce the charge rate, and avoids deterioration of performance of the electric device and user experience. In addition, the value range of the preset threshold meets the condition that the battery state of charge (SOC) corresponding to the preset threshold is 70% to 80%. The preset threshold selected within such a range can achieve better effects of suppressing lithium plating of the battery on a basis of minimizing impact on a charge duration.

Figure 10:
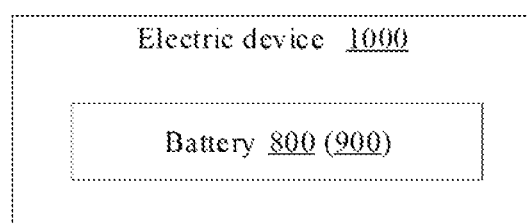
FIG. 10 is a schematic structural diagram of an electric device according to some embodiments of this application.

The following describes an electric device according to embodiments of this application with reference to FIG. 10. For the content that is not described in detail, reference may be made to the preceding embodiments. FIG. 10 is a schematic structural diagram of an electric device according to some embodiments of this application. As shown in FIG. 10, the electric device 1000 includes a battery 800 or a battery 900 according to the preceding embodiments.

In the technical solution provided in some embodiments of this application, the preset threshold of the electrical parameter is set. When the battery SOC reaches the preset threshold, the charge is suspended and the discharge is performed, thereby suppressing lithium plating of the battery and improving safety performance of the battery. This is achieved without a need to reduce the charge rate, and avoids deterioration of performance of the electric device and user experience. In addition, the value range of the preset threshold meets the condition that the battery state of charge (SOC) corresponding to the preset threshold is 70% to 80%. The preset threshold selected within such a range can achieve better effects of suppressing lithium plating of the battery on a basis of minimizing impact on a charge duration.

Finally, it should be noted that the foregoing embodiments are merely intended for describing the technical solutions of this application other than limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of this application.

What is claimed is:
1. A battery charging method, comprising:
performing a charging process on a battery; and
monitoring an electrical parameter of the battery during the charging process; wherein the charging process consists of the following steps:
when the electrical parameter of the battery reaches a first threshold, suspending charging of the battery and discharging the battery by applying a first negative pulse for a first duration of $t_1$;
continuing to charge the battery after discharging the battery for the first duration of $t_1$;

when the electrical parameter of the battery reaches a second threshold, suspending charging of the battery and discharging the battery by applying a second negative pulse for a second duration of $t_2$; and continuing to charge the battery after discharging the battery for the second duration of $t_2$;

wherein the first duration $t_1$ is greater than or equal to 3 seconds and less than 13 seconds, the second duration $t_2$ is greater than 3 seconds and less than or equal to 13 seconds, and $t_1$ is less than $t_2$; and wherein the electrical parameter is state of charge (SOC), and the first threshold is lower than the second threshold.

2. The battery charging method according to claim 1, wherein a negative electrode material of the battery comprises graphite.

3. The battery charging method according to claim 1, wherein
the first threshold is an SOC of 35% to 45%; and
the second threshold is an SOC of 70% to 80%.

4. The battery charging method according to claim 1, wherein the method further comprises:
determining whether the electrical parameter of the battery meets a charge stop condition; and
stopping charging of the battery when the electrical parameter of the battery meets the charge stop condition.

5. A battery charging controller, comprising one or more processors, wherein the processors work individually or jointly, and the processors are configured to:
perform a charging process on a battery; and
monitor an electrical parameter of the battery during the charging process;
wherein the charging process consists of the following steps:
when the electrical parameter of the battery reaches a first threshold, suspending charging of the battery and discharging the battery by applying a first negative pulse for a first duration of $t_1$;
continuing to charge the battery after discharging the battery for the first duration of $t_1$;
when the electrical parameter of the battery reaches a second threshold, suspending charging of the battery and discharging the battery by applying a second negative pulse for a second duration of $t_2$; and
continuing to charge the battery after discharging the battery for the second duration of $t_2$;
wherein the first duration $t_1$ is greater than or equal to 3 seconds and less than 13 seconds, the second duration $t_2$ is greater than 3 seconds and less than or equal to 13 seconds, and $t_1$ is less than $t_2$; and
wherein the electrical parameter is state of charge (SOC), and the first threshold is lower than the second threshold.

6. The battery charging controller according to claim 5, wherein a negative electrode material of the battery comprises graphite.

7. The battery charging controller according to claim 5, wherein
the first threshold is an SOC of 35% to 45%; and
the second threshold is an SOC of 70% to 80%.

8. The battery charging controller according to claim 5, wherein the processors are further configured to:
determine whether the electrical parameter of the battery meets a charge stop condition;
stop charging of the battery when the electrical parameter of the battery meets the charge stop condition.

9. A battery management system, comprising:
at least one processor; and
a memory coupled to the at least one processor,
wherein the memory stores an instruction executable by the at least one processor, and when the instruction is executed by the at least one processor, the at least one processor is configured to:
perform a charging process on a battery; and
monitor an electrical parameter of the battery during the charging process;
wherein the charging process consists of the following steps:
when the electrical parameter of the battery reaches a first threshold, suspending charging of the battery and discharging the battery by applying a first negative pulse for a first duration of t1;
continuing to charge the battery after discharging the battery for the first duration of t1;
when the electrical parameter of the battery reaches a second threshold, suspending charging of the battery and discharging the battery by applying a second negative pulse for a second duration of t2; and
continuing to charge the battery after discharging the battery for the second duration of t2;
wherein the first duration $t_1$ is greater than or equal to 3 seconds and less than 13 seconds, the second duration $t_2$ is greater than 3 seconds and less than or equal to 13 seconds, and $t_1$ is less than $t_2$; and
wherein the electrical parameter is state of charge (SOC), and the first threshold is lower than the second threshold.

10. The battery management system according to claim 9, wherein a negative electrode material of the battery comprises graphite.

11. The battery management system according to claim 9, wherein
the first threshold is an SOC of 35% to 45%; and
the second threshold is an SOC of 70% to 80%.

12. The battery management system according to claim 9, wherein the at least one processor is further configured to:
determine whether the electrical parameter of the battery meets a charge stop condition; and
stop charging of the battery when the electrical parameter of the battery meets the charge stop condition.

* * * * *